United States Patent [19]

Yver

[11] 4,084,710
[45] Apr. 18, 1978

[54] APPARATUS FOR PRODUCING HORIZONTAL AND VERTICAL RECIPROCATION MOVEMENT OF A TRANSFER ARM

[75] Inventor: Jacques Yver, Grenoble, France

[73] Assignee: Metallurgie Francaise des Poudres-Metafram, Paris, France

[21] Appl. No.: 759,742

[22] Filed: Jan. 17, 1977

[51] Int. Cl.² .............................................. B65G 47/90
[52] U.S. Cl. ................................. 214/1 BB; 74/22 R; 214/1 BD
[58] Field of Search ................... 214/1 R, 1 B, 1 BS, 214/1 BB, 1 BT, 1 BC, 1 BH, 1 BV, 1 BD, 147 T, 151; 74/22 R, 22 A, 25, 24, 55

[56] References Cited

U.S. PATENT DOCUMENTS

| 2,914,162 | 11/1959 | Anger | 214/1 BD X |
| 3,857,496 | 12/1974 | Gonzales | 214/1 BT |
| 4,027,767 | 6/1977 | Gluck | 214/1 BB X |
| 4,036,374 | 7/1977 | Woltjen | 214/1 BB |

FOREIGN PATENT DOCUMENTS 650,027  9/1937  Germany ........................ 214/1 BC Primary Examiner—Frank E. Werner
Attorney, Agent, or Firm—Haseltine, Lake & Waters

[57] ABSTRACT

A device for causing a horizontal to-and-fro motion and a vertical up-and-down motion of a transfer arm comprising a member for driving the transfer arm and to be connected thereto which is moved up-and-down by a vertical cam rotating about a horizontal axis and to-and-fro by a horizontal cam rotating about a vertical axis, a return assembly being provided for returning the driving member against the action of the cams.

6 Claims, 4 Drawing Figures

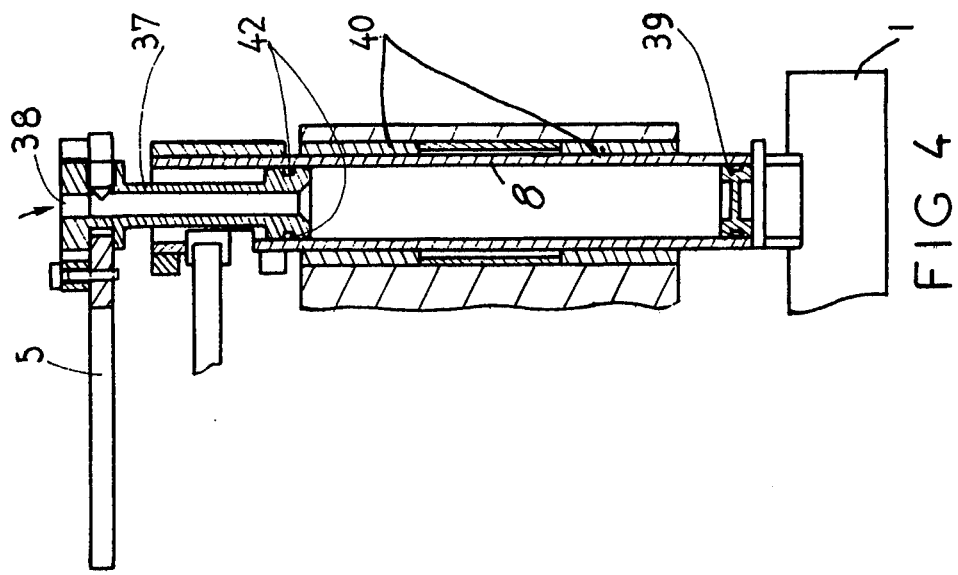
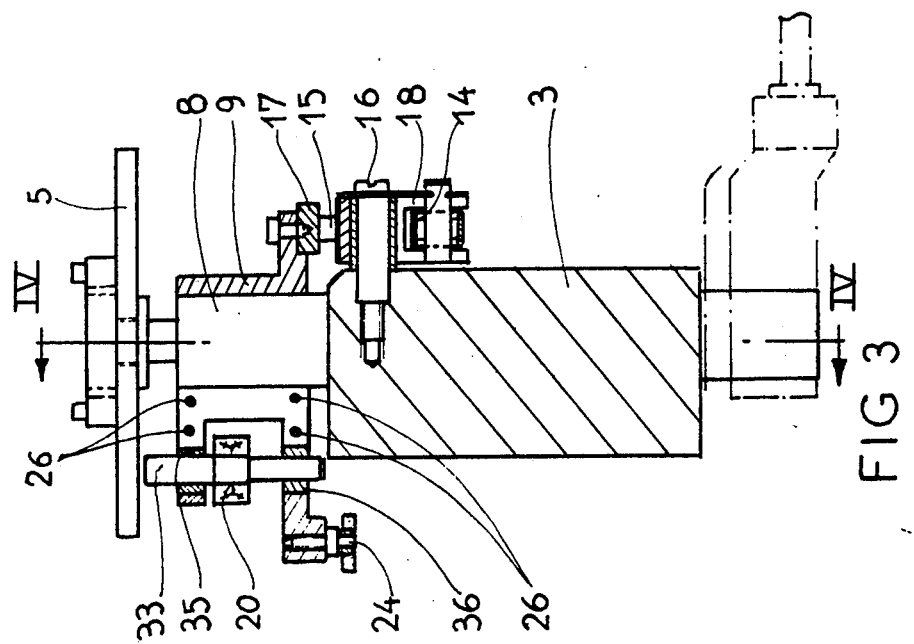

APPARATUS FOR PRODUCING HORIZONTAL AND VERTICAL RECIPROCATION MOVEMENT OF A TRANSFER ARM

FIELD OF THE INVENTION

The present invention relates to a device for movement of a rapid-operating transfer arm employed for feeding small parts to machines such as presses or for discharge of the parts after machining.

BACKGROUND

These machines which are rapid-operating are usually fed from stock by automatic feed means. The automatic feed means brings the parts one by one to a point adjoining the zone where the part is processed in the machine and a transfer arm is then operated to bring the part from this point to the processing zone in the machine. Similarly a transfer arm may be provided to remove the part from the processing zone to an automatic discharge device. Known transfer arms are usually endowed with a complicated motion comprising a to-and-fro horizontal motion and two identical vertical motions comprising a raising and a lowering of the arm when the arm has finished its horizontal motion in the forwards direction and in the return direction. The horizontal motion may be a motion of rotation about a vertical axis or a motion of translation of the arm in the horizontal plane. The horizontal motion serves to transfer the part from the automatic feed device to the machine or from the machine to the device for automatic discharge of the parts. The vertical motions enable picking up and laying down of the part from the machine feed device or from the machine and on the discharge device respectively.

For picking up or releasing the parts, these transfer arms are equipped at their ends with gripping devices which may be tongs, suckers or magnetic devices. These gripping devices may be actuated once at the moment of picking up the part and once at the moment of laying the part down.

The transfer arms are, for their movement, attached by the end opposite that which carries the gripping device, to a drive device which executes the horizontal and vertical motions composing the complex motion required. These devices must fulfill a certain number of conditions necessitated by the conditions of use of the transfer arms in association with rapid-operating machines. Thus the motions of the transfer arm must be perfectly synchronized with the different stages of the working cycle of the machine when it is required to allow the machine to work continuously, that is to say, without stopping the manufacturing cycle at the time of bringing up or of discharging the parts moving the transfer arm. In the majority of cases it is in fact quite desirable to operate continuously in order to make better use of equipment which is often costly. Additionally continuous running of machines, particularly presses, reduces the wear on members such as clutches which are actuated only rarely. Even in the case where operation is stroke by stroke it is desirable to reduce the transfer time and hence the time of stoppage of the machine. So in all cases it is desirable that the transfer time be as short as possible and in the case of continuous running rates of the order of 100 to 200 cycles per minute may be desirable. By transfer cycle is to be understood the whole of the operations comprising picking up a part on the feed device, conveying it and putting it down on the processing machine and the return of the arm to its starting position above the feed device. Obviously an equivalent definition can be given in the case of a transfer arm employed for discharge of machined parts. Another feature required of the transfer arm in all cases of its employment is accuracy of positioning. That is, in order that picking up of the part and conveyance of this part to the required spot in the machine be effected correctly it is necessary for the arm to have movements which are closely defined and not liable to variation with time. It is in short inconceivable to have to carry out frequent adjustments on devices for movement of transfer arms operating in association with highspeed machines carrying out series manufacture.

The devices employed hitherto do not permit very high speeds to be attained nor perfectly synchronized and very accurate movements of the transfer arm to be obtained. Devices for transfer arm movement are known which, for example, effect the horizontal and vertical motions of the arm by a roller rolling between a cam and a counter-cam with a very small clearance necessary for reducing friction. This clearance causes a lack of accuracy in the motions which gets steadily more pronounced with wear, in service. On the other hand each of the rollers controlling the movement of the arm horizontally and vertically is connected to a driving member attached to the transfer arm by a group of gears and relatively long levers having moderate rigidity and constituting masses in varying motion the inertia of which limits the performance both from the point of view of the speed and of the accuracy of the motions of the transfer arm.

SUMMARY OF THE INVENTION

According to the invention there is provided a device for causing a horizontal to-and-fro motion and a vertical lowering and raising motion after each of the horizontal forward and return motions of a transfer arm connected by one end to the device and comprising at its other end a device for gripping small or medium parts, the device comprising a fixed frame;

a member for driving the transfer arm and to be connected rigidly to the transfer arm;

means mounting said driving member in said frame for horizontal and vertical motion;

two perpendicular shafts;

means mounting said shafts for rotation in the frame;

a flat horizontal cam fixed to one of said shafts;

a flat vertical cam fixed to the other of said shafts;

means for driving said shafts in rotation; said cams being coupled to the said driving member such that said horizontal cam constitutes means for causing horizontal motion of said driving member and said vertical cam constitutes means for causing vertical motion of said driving member; and return means for returning said driving member against the action of said cams in the horizontal plane and the vertical direction respectively.

BRIEF DESCRIPTION OF THE DRAWINGS

The invention will be more fully understood from the following description of an embodiment thereof, given by way of example only with reference to the accompanying drawings:

In the drawings:

FIG. 3 is a vertical section taken along line III—III in FIG. 1; and

FIG. 4 is a vertical section taken along line IV—IV in FIG. 3.

DETAILED DESCRIPTION

Figure 2:
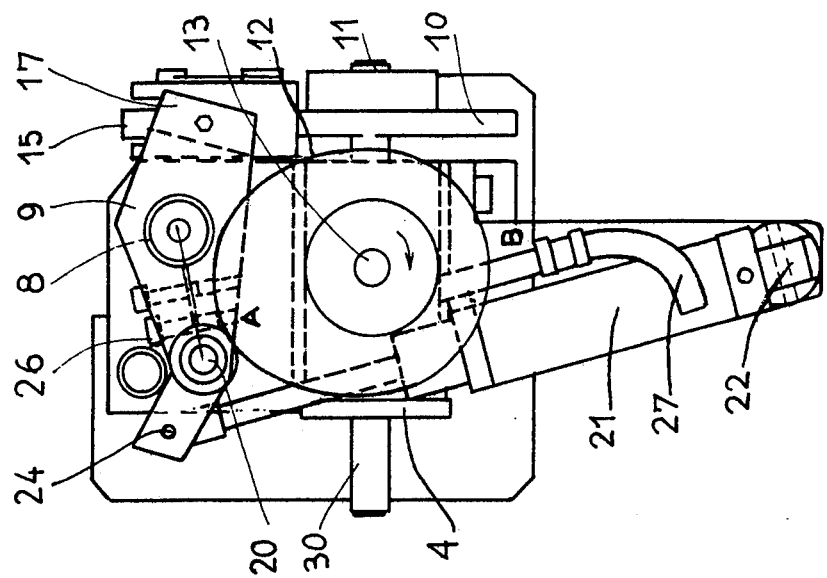
FIG. 2 is a plan view of the device of FIG. 1 with parts removed.

The device shown in the drawings is intended to move a transfer arm to rotate it about a vertical axis in forward and return direction and to move it up and down after each of the forward and return motions of rotation.

Figure 1:
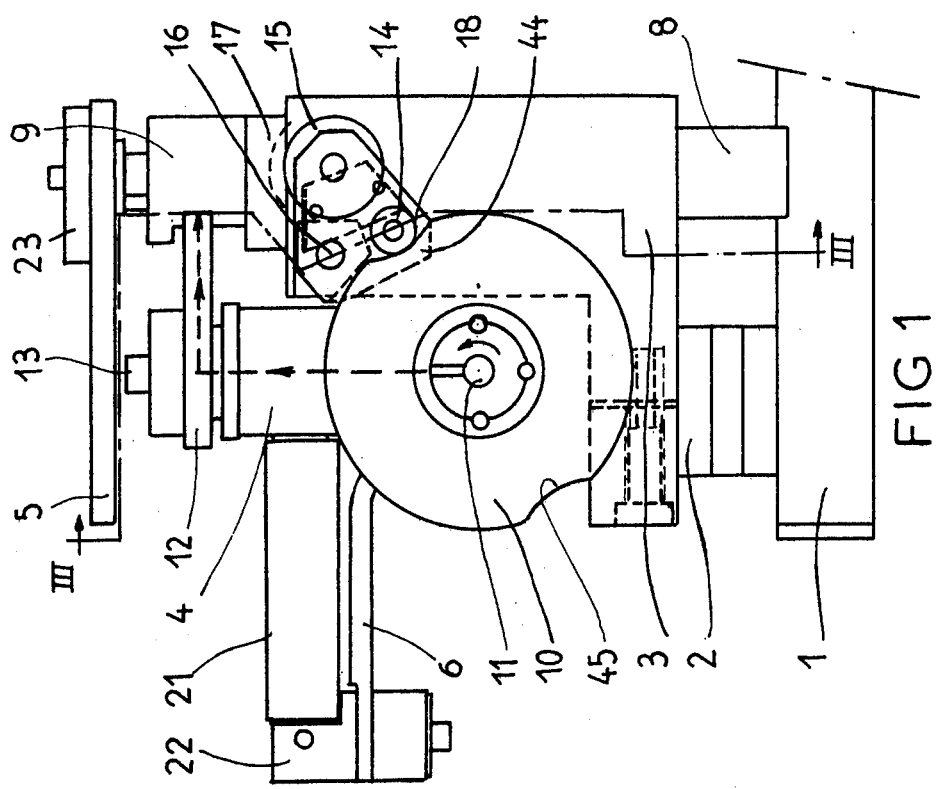
FIG. 1 is a side elevational view of an embodiment of a device in accordance with the invention.

In FIG. 1 is seen the fixed frame of the device comprising a base 1, a column 2 enabling adjustment in height and orientation of the device, a guide column 3, the housing 4 of an angled gear with bevel pinions, a top plate 5 and a supporting bracket 6. A transfer arm driving member consists of a shaft 8 and a lever 9 attached to the top portion of the shaft 8. The transfer arm may be attached to the bottom portion of the shaft 8 where it emerges from the guide column 3. The shaft 8, also called the tacking shaft, is guided in rotation and in translation in the direction of its axis by the guide column 3. A vertical cam 10 is attached to a horizontal output shaft 11 from the angled gear in housing 4. A horizontal cam 12 is attached to a vertical output shaft 13 from the angled gear, which shaft 13 is perpendicular to the shaft 11. The vertical cam 10 acts on the under surface of a bearer part or plate 17, attached to the bottom portion of the lever 9, by way of a generally triangular lever 18 rotatable about the axis of a pin 16 and carrying a roller 14 bearing against the cam 10 and a roller 15 bearing against the underneath of the plate 17. The horizontal cam 12 acts on the lever 9 by way of a roller 20 (FIG. 3). A jack 21 is articulated at 22 to the bracket 6 and a member for biasing the lever 9 against the action of the horizontal cam 12. The biasing or return member in the vertical direction of the shaft 8 consists of a device which will be described in greater detail with reference to FIG. 4, this device being attached to the top plate 5.

FIG. 2 is a plan view of the installation with the top plate 5 and the vertical return device which is connected to it having been removed. In this FIGURE is seen the lever 9 which is attached to the shaft 8 by screws 26 enabling a rigid attachment between the shaft 8 and the lever 9 together forming the transfer arm driving member. The rod of the jack 21 is articulated to the end of the lever 9 by a ball-and-socket joint 24. The jack which acts as a spring receives permanent air-pressure through the piping 27. The input shaft 30 to the angled gear is connected to a motor (not shown) which rotates the shaft 30 and the two perpendicular output shafts 11 and 13 connected the cams 10 and 12, by way of the bevel pinions. The shape of the horizontal cam 12 is such that its rotation causes rotation of the lever 9 and of the shaft 8 about the axis of the shaft 8 in one direction, the jack 21 exerting a return force keeps the roller 20 constantly in contact with the cam 12 to cause reverse rotation of the lever 9 and of the shaft 8. Rotation of the vertical cam 10 causes intermittent lowering of the lever 9 through the roller 15 in contact with the bearer part 17.

In FIG. 3 is seen the shaft 8 to the bottom portion of which is attached the transfer arm of which part has been shown in dash-dot line. The shaft 8 is arranged to be able to rotate and slide in the guide column 3. The lever 9 which is attached rigidly to the shaft 8 by the screws 26 bears at one end the ball-and-socket joint 24 for attachment of the jack 21. The lever 9 likewise carries the roller 20 against which is exerted the horizontal force causing rotation of the lever 9 and the shaft 8. The shaft 33 of the roller 20 is mounted to slide in bushes 35 and 36 carried by the lever 9. The pull exerted by the jack 21 on the lever 9 and 24 keeps the roller 20 constantly in contact with the cam 12. To that end of the lever 9 opposite to that provided with the ball-and-socket joint 24 for jack 21 is attached the bearer plate 17 against which the roller 15 bears. As previously mentioned the device for vertical movement is formed by the lever 18 hinged by the pin 16 to the guide column 3, the roller 14 which is kept in contact with the vertical cam 10 by the vertical return device for the transfer arm driving member, and the roller 15 bearing underneath the plate 17 which is fixed to the lever 9.

In FIG. 4 the hollow shaft 8 is shown in section inside the guide column 3. The bearing surface for guidance of the shaft 8 in rotation and in translation consists of two bushes 40 lining the inner portion of the guide column. To the top plate 5 fixed to the fixed frame is attached a piston 37, provided with a seal 42, which extends inside the hollow shaft 8. The piston 37 is hollow and its central opening 38 enables air or resilient gas under pressure to be passed inside the shaft 8. The bottom portion of the shaft 8 is closed by an airtight plug 39 so that the shaft 8 is thus subject, by the effect of the gas, to a vertical downwardly directed return force. This return force is absorbed by way of the lever 9, the bearer part 17, the roller 15, the lever 18 and the roller 14 against the vertical cam 10. Hence the force exerted by the return device clearly creates an action opposed to the action of the vertical cam.

Operation of the above described device for movement of a transfer arm will now be described.

The transfer arm is attached to the bottom of the shaft 8 as shown in FIG. 3. The motor connected to the input shaft 30 of the angled gear is put into operation, rotation of the shaft 30 causing the rotation of the output shafts 11 and 13, and of the cams 10 and 12 which are attached to them, at identical speeds. The vertical cam 10 has a generally circular shape but has two recessed zones 44 and 45 in its periphery. Rotaion of the cam 10, as long as the roller 14 is in contact with one of the circular portions of the cam lying between the two zones 44 and 45, produces no effect upon the lever 18 and roller 15. During all this time there is no vertical movement of the lever 9 and the shaft 8, the roller 15 being in its upper position shown in dotted line in FIG. 1. When the roller 14 comes into contact with one of the recessed zones 44 or 45, the downwards directed vertical return force exerted by the piston 37 causes tilting of the lever 18 about its pin 16 and then the return of the lever 18 to the position shown in full lines in FIG. 1. This motion causes lowering and then raising of the sliding shaft 8 and the lever 9, accompanied by a corresponding motion of the transfer arm to and from the position shown in FIG. 3.

The lowering motion of the lever 9 is carried out without corresponding movement of the roller 20 because the shaft 33 is mounted to slide in the bushes 35 and 36 carried by the lever 9. The roller 20 therefore remains in pure rolling contact with the cam 12 without any axial friction.

The rotation of the horizontal cam 12 produces an angulation (or rotation through a certain angle) alternatively in one direction and in the other of the lever 9 and the shaft 8 which is attached rigidly to it and hence of the transfer arm which is attached to the shaft 8, since the cam 12 has a shape such that the distance between its axis of rotation and the point of contact with the roller 20 varies in a continuous fashion between a maximum (point A in contact with the roller 20) and a minimum (point B in contact with the roller 20) and vice versa. The direction of rotation of the cam 12 being that shown by the arrow in FIG. 2, when the cam executes half a revolution the point B will come into contact with the roller 20. While the cam 12 is executing this half-revolution the jack 21 makes the lever 9 rotate through a certain angle which is equal to the required amplitude of rotation of the transfer arm in the direction opposite to the direction of rotation of the cam. During the next half-revolution of the cam 12, when it is returning towards the position shown in FIG. 2, the lever is pushed back by the cam to the position shown in FIG. 2, the shaft 8 and the transfer arm executing the same angle of rotation as the lever 9. During the course of a complete revolution of the horizontal cam, therefore, the transfer arm executes its horizontal to-and-fro motion.

The cams 10 and 12 are relatively arranged on the shafts 11 and 13 respectively so that when the roller 14 is at the bottom of the recessed zone 44 (the position shown in FIG. 1) the point A of the cam 12 is in contact with the roller 20 (the position shown in FIG. 2). Since the cams are revolving at the same speed, when the roller 14 is at the bottom of the zone 45 the point B is in contact with roller 20. Thus at the end of each of the horizontal forwards and return motions of the transfer arm the roller 14 comes into contact with one of the recessed zones of the cam 10 to cause rotation of the lever 18 and lowering of the shaft 8 and the transfer arm under the effect of the vertical return force. Immediately afterwards, the rising of the roller 14 again onto the unnotched portion of the cam 10 causes rotation of the lever 18 such that the roller 15 comes into its position shown in dotted line in FIG. 1, so raising the bearing-part 17 on the lever 9, the shaft 8 and the transfer arm which is again lying in its upper position for carrying out its horizontal stroke in the reverse direction. The shape of the cam 12 is such that the arm remains at one of its extreme angular positions during the lowering and raising motion caused by the vertical cam. During rotation of the lever 9 the bearing part 17 remains in contact with the roller 15, mutual movement taking place by rolling of the roller. It can be seen that the transfer cycle is a function solely of the speed of rotation of the input shaft 30 to the angled gear. Synchronization of the horizontal and vertical motions is on the other hand very simple to effect.

A device as described above has enabled transfer operations to be effected at very high rates, of the order of 100 to 200 cycles per minute. The attainment of this speed of operation has not moreover been effected to the detriment of the reliability and accuracy of operation of the device, which remain very good. These improved results are certainly to a large part due to the fact that the device enables all the parts having alternating motions to be lightened and simplified considerably. The fact of having at the input to the device a gear with bevel pinions which enables the rotary actuator members for the horizontal motion and for the vertical motion to be separated is the cause of this extreme simplification of the members with alternating motions. That is, the cams act by way of simple rollers on the device for driving the transfer arm, no transmission by lever or by gear being in that case necessary.

Another advantage is that the return devices keep the cams and rollers constantly in contact and that wear of these actuator elements therefore has no influence on the operation of the device.

The invention is not intended to be restricted to the embodiment which has just been described, but it comprises on the contrary every variant. The device which has just been described is intended to cause a horizontal motion which is a rotation, the transfer arm driving member comprising a shaft rotatable in the fixed frame, but other types of guide member may be conceived of such that the movement of the transfer arm would be a translation in one sense and the other in a horizontal direction.

In the device which has just been described the cams act upon the transfer arm driving member by way of roller devices, but other methods of actuation of the transfer arm driving member by the cams may be used. The return members along the vertical direction and in the horizontal plane have been described in the form of pneumatic jacks which do not consume any permanent flow of fluid except for possible insignificant leakage. Other return devices, for example, springs, may equally well be used.

The device which has just been described is particularly suitable for application in the case of presses handling small parts such as presses for gauging fritted parts. In the case of presses operating at medium rates the device enables the transfer arm to be actuated more rapidly in order to put the part down in the tool and this arm remains for a shorter length of time in the zone swept vertically by the press slide carrying the movable tool elements, which enables taller parts to be manufactured or bulkier tools to be employed, that is to say, a wider field of use of the press to be preserved. The device may equally well be employed for actuating a transfer arm intended for feeding or discharge of parts in conjunction with a cold or hot forging press. The transfer arm connected to the device may also be employed in packaging, wrapping, or checking installations or for charging of continuous furnaces or installations for painting or for various kinds of processing of individual parts.

What is claimed is:

1. A device for causing a horizontal to-and-fro motion and a vertical lowering and raising motion after each of the horizontal forward and return motions of a transfer arm connected by one end to the device and comprising at the other end of the transfer arm a device for gripping small or medium parts, the device comprising:

a fixed frame;
   a member for driving the transfer arm and to be connected rigidly to the transfer arm;
   means mounting said driving member in said frame for horizontal and vertical motion;
   two perpendicular shafts;
   means mounting said shafts for rotation in the frame;
   a flat horizontal cam fixed to one of said shafts;
   a flat vertical cam fixed to the other of said shafts;
   means for driving said shafts in rotation; said cams being coupled to the said driving member such that said horizontal cam constitutes means for causing horizontal motion of said driving member and said vertical cam constitutes means for causing vertical motion of said driving member; and return means for returning said driving member against the action of said cams in the horizontal plane and the vertical direction respectively.

2. A device as claimed in claim 1, wherein said means for driving said shafts in rotation comprise an angled gear with bevel mounted on said fixed frame and having an input shaft to be coupled to a motor and two output shafts constituting said perpendicular shafts.

3. A device as claimed in claim 1, wherein the horizontal motion is a rotation, said driving member includes a shaft having a vertical axis and mounted to slide and rotate in said fixed frame, and a lever fixed to said driving shaft and which is in engagement with said cams by way of roller means.

4. A device as claimed in claim 3, wherein said driving shaft is in the form of a tube closed at one end and said return means for said driving member against the action of the vertical cam includes a piston connected to said fixed frame and slidable inside said driving shaft in an airtight manner, said piston being hollow and adapted for connection to a source of fluid under pressure to place the interior of said driving shaft in communication with the source of fluid under pressure which thereby exerts a return force on said driving shaft by action and closed end of said driving shaft.

5. A device as claimed in claim 4, wherein said return means for said driving member against the action of said horizontal cam includes a jack for connection to a source of elastic fluid under pressure.

6. A device as claimed in claim 1, wherein said return means for said driving member against the action of said horizontal cam includes a jack for connection to a source of elastic fluid under pressure.

* * * * *